(12) United States Patent
Villemaire et al.

(10) Patent No.: US 12,518,202 B1
(45) Date of Patent: Jan. 6, 2026

(54) INTEGRATING MACHINE LEARNING CLASSIFICATION MODELS AND MACHINE LEARNING ANOMALY MODELS

(71) Applicant: Bentley Systems, Incorporated, Exton, PA (US)

(72) Inventors: André Villemaire, Quebec (CA); Simon Savary, Quebec (CA); Marc-André Gardner, Quebec (CA); Olivier Bloch, Beauport (CA)

(73) Assignee: Bentley Systems, Incorporated, Exton, PA (US)

( * ) Notice: Subject to any disclaimer, the term of this patent is extended or adjusted under 35 U.S.C. 154(b) by 1094 days.

(21) Appl. No.: 17/522,496

(22) Filed: Nov. 9, 2021

(51) Int. Cl.
*G06N 20/00* (2019.01)
*G06F 18/21* (2023.01)

(52) U.S. Cl.
CPC ......... *G06N 20/00* (2019.01); *G06F 18/2178* (2023.01)

(58) Field of Classification Search
CPC .............................. G06N 20/00; G06F 18/00
See application file for complete search history.

(56) References Cited

U.S. PATENT DOCUMENTS

| | | | |
|---|---|---|---|
| 9,015,093 B1* | 4/2015 | Commons | G06N 3/04 706/26 |
| 9,983,776 B1* | 5/2018 | Wu | G06F 3/0482 |
| 10,063,575 B2 | 8/2018 | Vasseur et al. | |
| 10,270,788 B2 | 4/2019 | Faigon et al. | |
| 10,295,435 B1* | 5/2019 | Wu | G01M 5/0066 |
| 10,417,524 B2 | 9/2019 | Feng et al. | |
| 11,144,814 B2 | 10/2021 | Cha et al. | |
| 2015/0254555 A1* | 9/2015 | Williams, Jr. | G06N 3/045 706/14 |
| 2018/0144214 A1* | 5/2018 | Hsieh | G06T 7/0002 |
| 2019/0137985 A1 | 5/2019 | Cella et al. | |
| 2019/0303799 A1* | 10/2019 | Gottin | G06N 20/20 |
| 2020/0090002 A1* | 3/2020 | Zhu | G06N 3/047 |
| 2021/0073685 A1* | 3/2021 | Veshchikov | G06F 21/56 |
| 2022/0155773 A1* | 5/2022 | Kulshreshtha | G05B 23/0283 |
| 2022/0406098 A1* | 12/2022 | Georgeson | G06N 3/045 |

OTHER PUBLICATIONS 100-2000—The Authororitative Dictionary of IEEE Standards Terms, Seventh Edition; pp. 77 and 508 (Year: 2000).*
Huang et al. ("State-of-the-art review on Bayesian interernce in structural system idnetification and damge assessment", Advances in Structural Engineering 2019, vol. 22(6) pp. 1329-1351).*

(Continued)

*Primary Examiner* — Jennifer N Welch
(74) *Attorney, Agent, or Firm* — Cesari and McKenna, LLP; James A. Blanchette

(57) ABSTRACT

In example embodiments, a hybrid classification/anomaly machine learning architecture is provided that combines a classification model and an anomaly model to perform an engineering task. The classification model and the anomaly model may be used in parallel, and their inference results compared, with their consistency used to improve confidence, and their inconsistency used to detect when additional training or other improvement is required and to capture data useful in such additional training/improvement.

13 Claims, 14 Drawing Sheets

(56) References Cited

OTHER PUBLICATIONS

Son et al. ("Deep Learning-Based Anomaly Detection to Classify Inaccurate Data and Damaged Condition of a Cable-Stayed Bridge", IEEE 2021 vol. 9, pp. 124549-124559).*

Chen, Xiaoliang, et al., "Self-Taught Anomaly Detection With Hybrid Unsupervised/Supervised Machine Learning in Optical Networks," IEEE, Journal of Lightwave Technology, vol. 37, No. 7, Apr. 1, 2019, pp. 1742-1749.

Kawachi, Yuta, et al., "Complementary Set Variational Autoencoder for Supervised Anomaly Detection," IEEE, 2018 IEEE International Conference on Acoustics, Speech and Signal Processing (ICASSP), ICASSP 2018, Calgary, AB, Canada, Apr. 15-20, 2018, pp. 2366-2370.

Ruff, Lukas, et al., "Deep Semi-Supervised Anomaly Detection," arXiv, Conference Paper ICLR 2020, Feb. 14, 2020, pp. 1-23.

U.S. Appl. No. 17/128,912, filed Dec. 21, 2020 by Karl-Alexandre Jahjah et al. for Techniques for Labeling, Reviewing and Correcting Label Predictions for P&Ids, pp. 1-44.

U.S. Appl. No. 17/129,205, filed Dec. 21, 2020 by Marc-Andre Gardner et al. for Techniques for Extracting Machine-Readable Information From P&Ids, pp. 1-29.

U.S. Appl. No. 17/314,735, filed May 7, 2021 by Louis-Philippe Asselin et al. for Classifying Elements and Predicting Properties in an Infrastructure Model Through Prototype Networks and Weakly Supervised Learning, pp. 1-40.

U.S. Appl. No. 17/469,523, filed Sep. 8, 2021 by Marc-Andre Gardner et al. for Techniques for Predicting Railroad Track Geometry Exceedances, pp. 1-39.

* cited by examiner

INTEGRATING MACHINE LEARNING CLASSIFICATION MODELS AND MACHINE LEARNING ANOMALY MODELS

BACKGROUND

Technical Field

The present disclosure relates generally to machine learning, and more specifically to machine learning models used to perform engineering tasks.

Background Information

Machine learning is becoming increasingly important for a variety of engineering tasks. One example engineering task is the inspection of infrastructure (e.g., bridges, buildings, roads, railways, electrical and communication networks, equipment, etc.) for damage (e.g., cracks, corrosion, excessive movement, etc.). By using machine learning to analyze representations (e.g., images, three-dimensional (3D) point clouds, etc.) of the infrastructure, time-consuming visual inspection by field engineers may be minimized or avoided entirely.

Traditional machine learning models may be broadly categorized into classification models and anomaly models. A classification model is a predictive model (e.g., a deep neural network) that is trained to detect and locate specific trained features, associating each with a predicted class label. For example, in the case of inspection of representations of a bridge for damage, a feature may be a class of damage, such as a crack. Classification models are commonly trained using supervised learning, using a labeled dataset for the training. A labeled dataset refers to a dataset in which the data is associated with its ground truth (i.e., the answer the model is being trained to learn and that is desired to be produced during inference). For instance, returning to the example of inspection of representations of a bridge for damage, ground truth may be the cracks and their location in a set of training representations (e.g., training images, training 3D point clouds, etc.), where the location of cracks in new representations (e.g., new images, new 3D point clouds, etc.) is desired to be produced during inference.

Producing a labeled dataset for training a classification model is traditionally a difficult, time-consuming task. Typically, a human subject matter expert (SME) will inspect each sample of training data and create an accurate label (ground truth) associated with the data. For instance, returning to the example of inspection of representations of a bridge for damage, this may require drawing a polygon or other shape around each crack in a set of training representations of bridges. This task can take up to several minutes per representation. Because training a classification model typically requires in the low hundreds (up to the high hundreds or more) of examples per feature, the task of labeling can be a drain on project resources. If the process is rushed, and labels are of poor quality, classification model performance may suffer.

There have been various attempts to reduce labeling burden for classification models. One technique that has been used is transfer learning. In transfer learning, a pretrained model is started with, and training is performed for only a small subset of model parameters, thereby requiring less labeled data. However, even with transfer learning, training a classification model is still unduly burdensome.

In addition to the burden of labeling, classification models often suffer a number of other shortcomings. One such shortcoming is limited ability to detect and locate relevant elements other than the specific trained features. For example, in the case of inspection of representations of a bridge for damage, a classification model may be trained using a set of training representations including cracks, and the classification model may be able to well detect and locate cracks. However, the classification model may not well detect and locate anything other than a crack, for example, a hole. In other words, a classification model typically follows an "opt-in" paradigm, where everything that to be detected must be explicitly provided.

Further, classification models typically require extensive training to be completed before performance can be tested and validated, and meaningful inferences can be performed. The training workflow and the exploitation workflow are separate and sequential. There is limited ability for early exploitation of the model (e.g., to obtain a useful solution in its simplest form before the fullest expression is available). Further, if performance is not satisfactory, the workflows typically must the repeated, again in a separate and sequential manner. For example, different datasets may need to be selected and/or labeled in a different manner in training, before exploitation is possible.

Still further, classification models may be prone to eventual failure due to model drift. Model drift refers to a phenomenon where the nature and statistical distribution of input data sets progressively changes (i.e., drifts) over time compared to the nature and distribution found in the training dataset, leading to ill-adapted and degraded model performance. When model drift becomes severe, new features will go unnoticed mostly because the model was never trained with those features.

The other broad category of machine learning models is anomaly models. An anomaly model is a predictive model (e.g., a deep neural network) that is trained to detect when presented data deviates from normality that has been previously learned. For example, in the case of inspection of representations of a bridge for damage, an anomaly model may produce alerts when representations contain something other than a bridge in undamaged condition. In this sense, an anomaly model typically follows an "opt-out" paradigm, where it detects everything but normal situations. Notably, an anomaly model will typically not classify the anomaly (e.g., specifically indicate it is a crack). Like classification models, anomaly models are commonly trained using supervised learning. However, labeling datasets for training anomaly models is typically simpler and less time consuming. While training classification models typically requires normal (i.e., featureless) and feature (i.e., class) data, training anomaly models typically only requires normal (i.e., featureless) data. Labeling normal data is usually a much faster task for an SME to perform, as they can avoid class assessment. Moreover, many source datasets include predominantly normal samples. It is typically much easier to compile large amounts of training data that is entirely normal than data that includes features that have to be labeled.

While one may attempt to use anomaly models to avoid the burden of labeling and/or other shortcomings of classification models, anomaly models have limitations that prevent their direct substitution. Among these is that anomaly models cannot readily predict class information about an anomaly. Instead, they simply predict presence of an anomaly (i.e., something other than normal). Accordingly, an anomaly model cannot readily be substituted for a classification model when performing many engineering tasks.

Accordingly, there is a need for improved machine learning architectures that can address some or all of the shortcomings of traditional classification model workflows.

SUMMARY

In example embodiments, a hybrid classification/anomaly machine learning architecture is provided that combines a classification model and an anomaly model to perform an engineering task. The classification model and the anomaly model may be used in parallel, and their inference results compared, with their consistency used to improve confidence, and their inconsistency used to detect when additional training or other improvement is required and to capture data useful in such additional training/improvement. A hybrid classification/anomaly machine learning architecture may address the burden of labeling with classification models with traditionally techniques. The hybrid classification/anomaly architecture may require normal examples to begin to produce useful solutions and may automatically select samples of interest to add to the training dataset to improve results, reducing the labeling burden on a SME. This may enable early exploitation and more efficient overlapping and parallelized training workflow. Further, it may enable improved model resilience, detecting when models need updating to address model drift and refining the training datasets used in such update.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
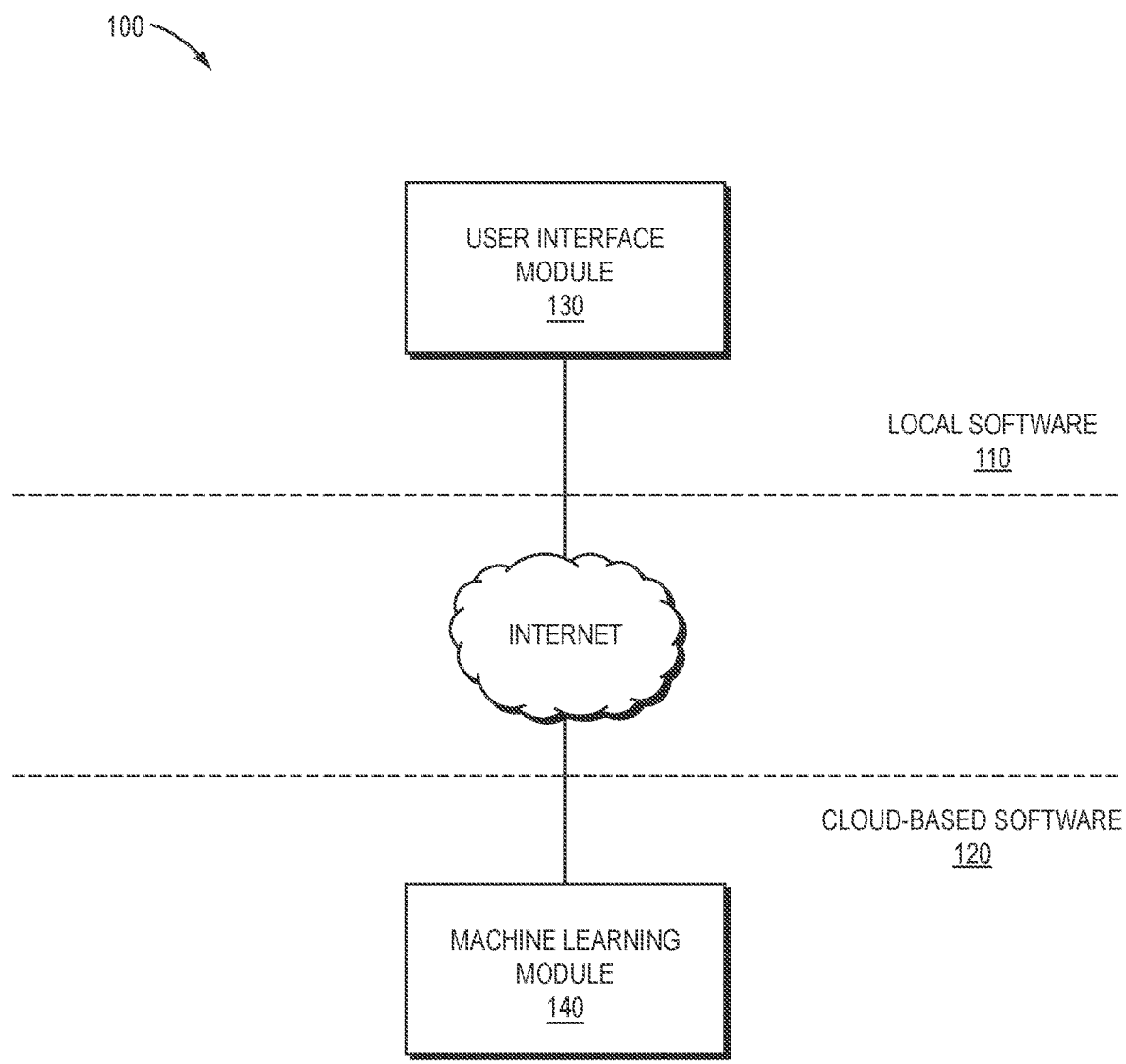
FIG. 1 is a high-level block diagram of an example application that uses machine learning to perform an engineering task.

FIG. 1 is a high-level block diagram of an example application 100 that uses machine learning to perform an engineering task. One example engineering task is the inspection of infrastructure for damage, for example the inspection of representations (e.g., images, 3D point clouds, etc.) of a bridge to detect the presence and/or location of cracks. The application 100 may be a stand-alone software application or a component of a larger software application. In one example implementation, the application 100 is the AssetWise® Inspections application, available from Bentley Systems, Inc. of Exton, PA, which includes functionality for capturing, analyzing, and managing data for bridge inspection. However, it should be understood that the application 100 may take a variety of other forms.

The application 100 may be divided into local software 110 that executes on one or more computing devices local to an end-user (collectively "local devices") and, in some cases, cloud-based software 120 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 110 may include a number of software modules operating on a local device and the cloud-based software 120, if present, may include, additional software modules operating on cloud computing devices. Operations may be divided in a variety of different manners among the software modules. For example, in one implementation, software modules of the local software 110 may be responsible for performing non-processing intensive operations such as providing user interface functionality. To such end, the software modules of the local software 110 may include a user interface module 130, as well as other software modules (not shown). The software modules of the cloud-based software 120 may perform more processing intensive operations, such as operations related to machine learning. To such end, the software modules of the cloud-based software 120 may include a machine learning module 140 that implements a hybrid classification/anomaly machine learning architecture. As explained in more detail below, the machine learning module 140 may use a classification model and an anomaly model may in parallel, and compare their inference results, with their consistency used to improve confidence in positive results, and their inconsistency used to detect when additional training is required, and to capture new data useful in such training.

Figure 2:
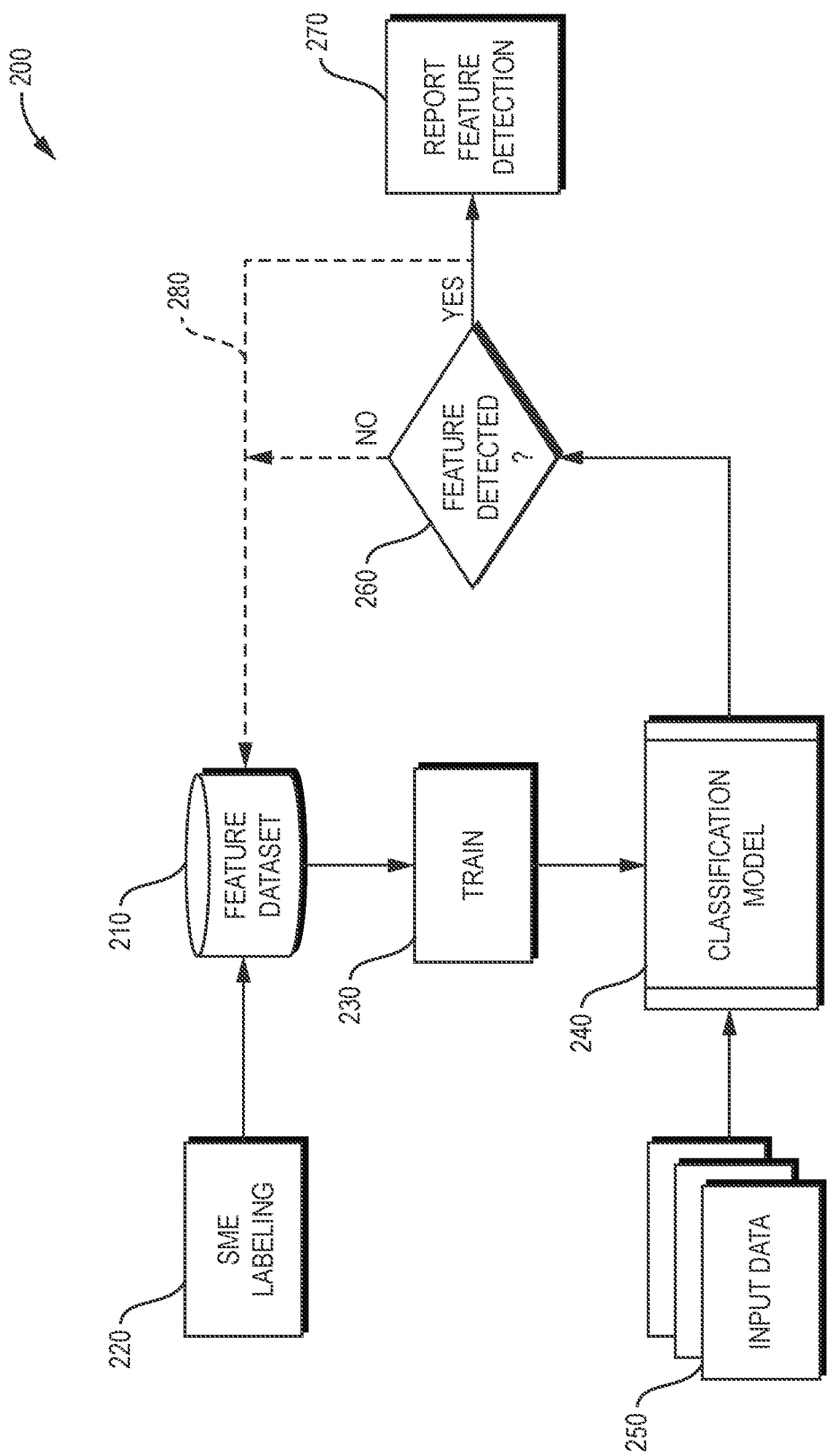
FIG. 2 is a diagram of an example workflow to train and perform inference with a classification model.

FIG. 2 is a diagram of an example workflow 200 to train and perform inference with a classification model. A training dataset that includes at least a believed-sufficient number and quality of features of each class is collected (referred to herein as a "feature dataset" 210). At step 220, a SME is prompted to inspect each sample and create class labels. For instance, returning to the example of inspection of representations of a bridge for damage, the SME may draw a polygon or other shape around cracks and label them specifically as such. The SME will generally also label normal (i.e., featureless) samples. For instance, the SME may label representations with no damage as normal. Once this is complete, at step 230, the application 100 trains a machine learning classification model 240 (e.g., a deep neural network) using the feature dataset 210. The application 100 may validate performance of the classification model 240 and repeat training if performance metrics are not achieved (not shown). Thereafter, the classification model 240 is ready for exploitation (inference). In inference, the application 100 submits input data 250 to the classification model 240 which produces inference results indicating whether a feature is detected. The inference results include one of n answers, where n is the number of classes. For instance, returning to the example of inspection of representations of a bridge for damage, the inference results may indicate a crack (as opposed to another type of damage) was detected. At step 260, the application 100 determines whether a feature is detected. If so, execution may proceed to step 270, where the detected feature is reported (e.g., in the user interface of the application 100).

Typically, if no feature is detected, nothing further will occur. One may envision that input data used for a specific inference result (leading to either a feature detection or lack-thereof) could be retained to augment the feature dataset 210 (as illustrated by dotted line 280), for use in retraining the classification model 240. While possible, this is generally not done in existing implementations. Since this form of annotation is coming only from the classification model 240 itself, rather than ground truth, there is a risk that feeding back the result of the inference could increase model drift, allowing small biases to grow over time via the feedback.

Figure 3:
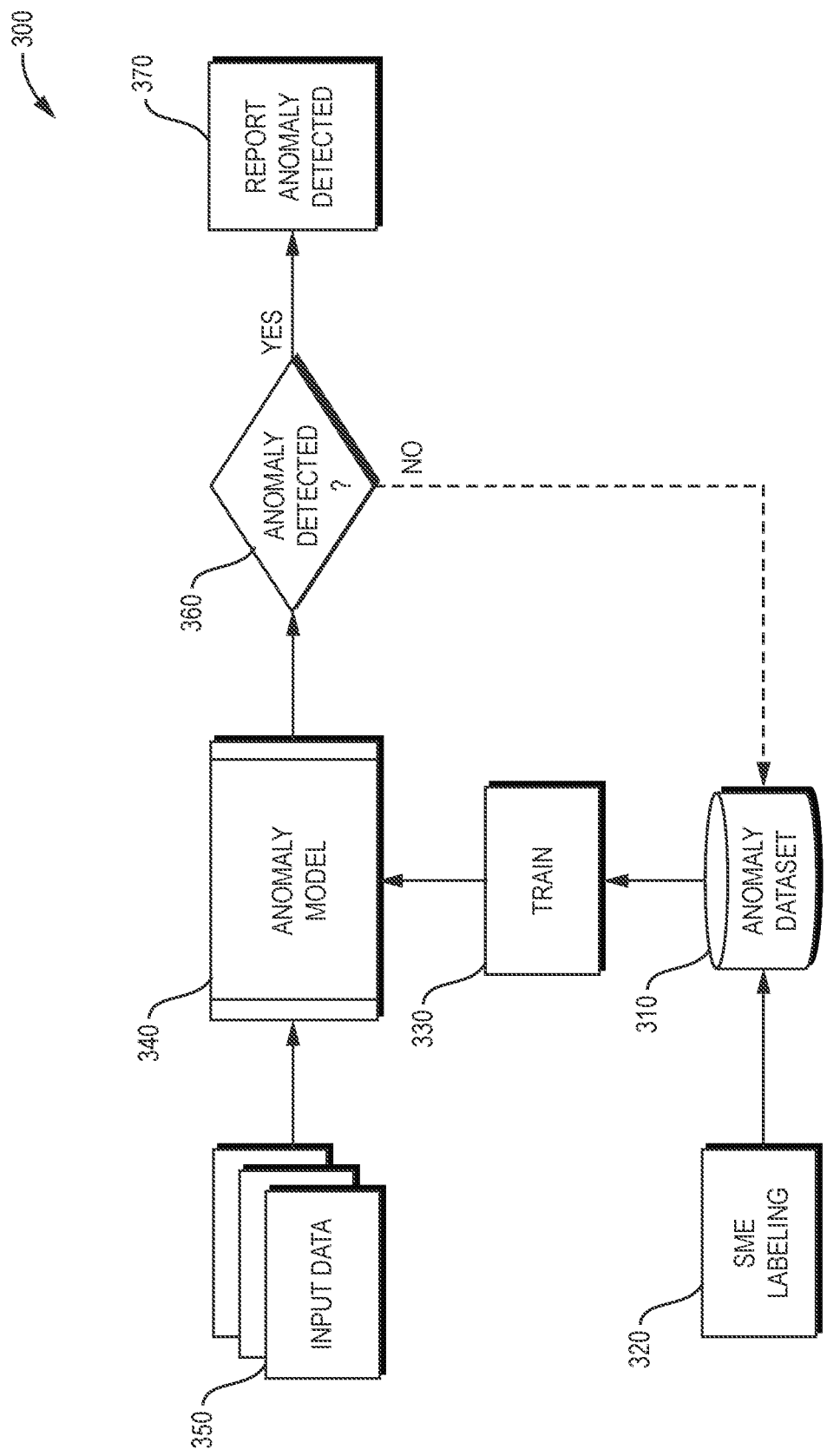
FIG. 3 is a diagram of an example workflow to train and perform inference with an anomaly model.

FIG. 3 is a diagram of an example workflow 300 to train and perform inference with an anomaly model. A training dataset that includes at least a believed-sufficient number of normal samples (i.e., featureless samples) is collected (referred to herein as a "anomaly dataset" 310). Samples with features are typically not included. At step 320, a SME is prompted to inspect each sample and verify it is normal. For instance, returning to the example of inspection of representations of a bridge for damage, the SME may verify each sample is a representation of a bridge with no damage. Once this is complete, at step 330 the application 100 trains a machine learning anomaly model (e.g., a deep neural network) 340 using the anomaly dataset 310. The application 100 may validate performance of the anomaly model 340 and repeat training if performance metrics are not achieved (not shown). Thereafter, the anomaly model 340 is ready for exploitation (inference). In inference, the application 100 submits input data 350 to the anomaly model 340 which produce inference results indicating whether an anomaly is detected. The inference result include a binary answer (e.g., normal or anomaly) and a confidence for this answer. For instance, returning to the example of inspection of representations of a bridge for damage, the inference result may indicate an anomaly when a crack (or some other damage) is present in one of the input representations, but not specifically identify the damage as a crack. At step 360, the application 100 determines whether an anomaly is detected. If so, execution may proceed to step 370, where the anomaly is reported (e.g., in the user interface of the application 100).

Typically, if no anomaly is detected nothing further will occur. One may envision that input data that is determined to be normal could be retained to augment the anomaly dataset 310 (as illustrated by dotted line 380), for use in retraining the anomaly model 310. While possible, this is generally not done in existing implementations. Since this form of annotation is coming only from the anomaly model 340 itself, rather than ground truth, there is risk that feeding back the result of the inference could increase model drift, allowing small biases to grow over time via feedback.

Figure 4:
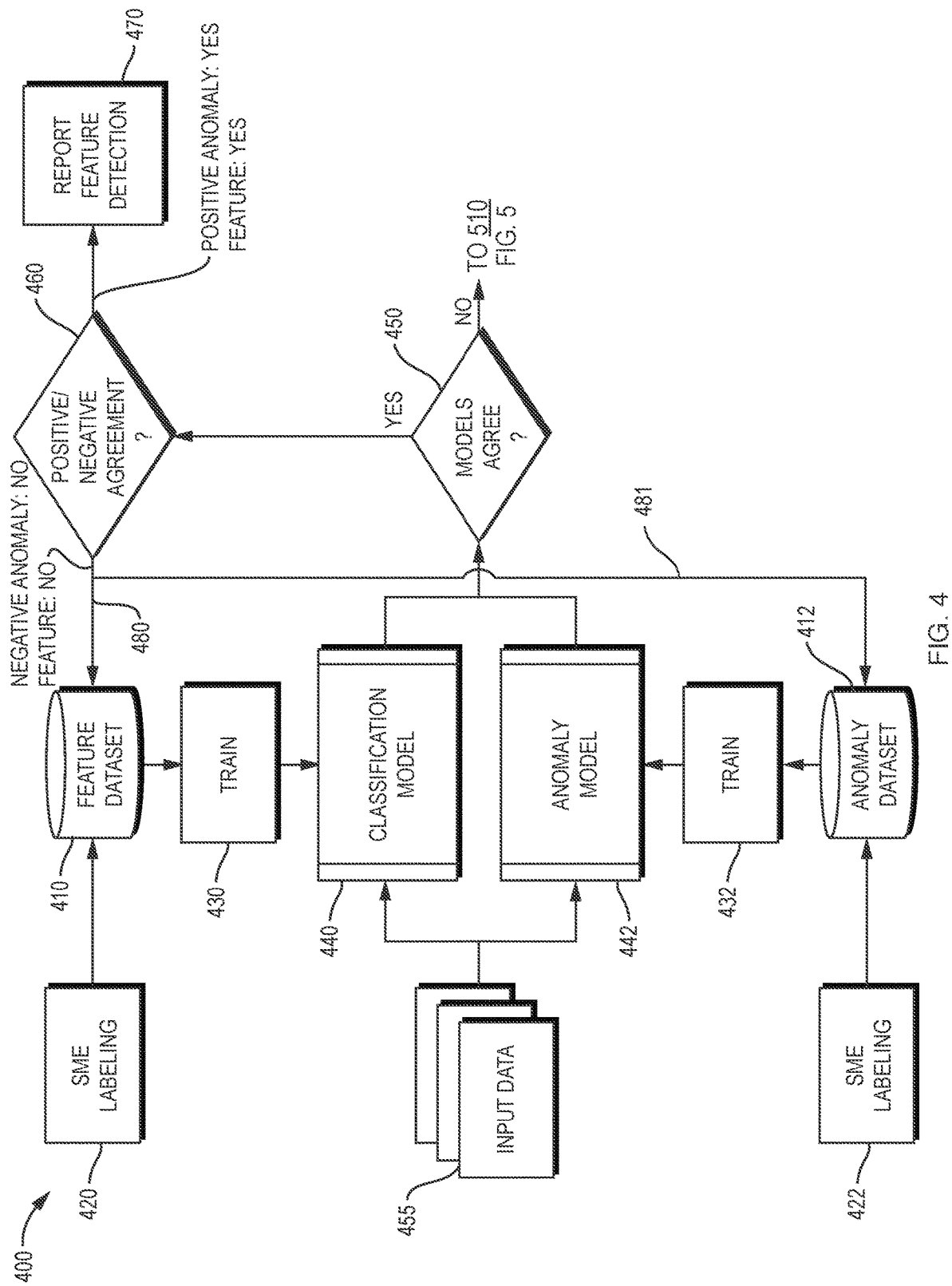
FIG. 4 is a diagram of a first example workflow to train and perform inference with a hybrid classification/anomaly machine learning architecture.

FIG. 4 is a diagram of a first example workflow 400 to train and perform inference with a hybrid classification/anomaly machine learning architecture. In this implementation, a machine learning classification model (e.g., a deep neural network) 440 and machine learning anomaly model (e.g., a deep neural network) 442 are used in parallel in inference, each being fed the same input data 455 and producing respective inference results, which are then compared for consistency. Consistent results (which is covered in connection with FIG. 4) may improve confidence. Inconsistent results (which is covered in connection with FIG. 5) may indicate additional training or another model improvement is required.

The anomaly model 442 may be initially trained individually, similar to as in FIG. 3. An anomaly dataset 412 that includes at least a believed-sufficient number of normal samples (i.e., featureless samples) is collected. Samples with features are not included. At step 422, a SME is prompted to inspect each sample and verify it is normal. Once this is complete, at step 432, the application 100 trains the anomaly model 442 using the anomaly dataset 412.

The classification model 440 may receive some initial individual training (e.g., using an initial feature dataset 410), or as discussed in more detail below, be trained entirely using a hybrid startup procedure that leverages the capabilities of the anomaly model (e.g., to reduce labeling burden on the SME and enable earlier exploitation). If some initial individual training of the classification model 440 is performed, it may occur similar to as in FIG. 2. A feature dataset 410 that includes features of each class may be collected. At step 420, a SME is prompted to inspect each sample and create class labels. The SME will generally also label normal (i.e., featureless) samples. Once this is complete, at step 430 the application 100 trains the classification model 440 using the feature dataset 410.

In inference, the application 100 submits the same input data 455 in parallel to the classification model 440 and the anomaly model 442 which each produce inference results. The classification model 440 produces inference results indicating which feature is detected (e.g., one of n answers, where n is the number of classes), and the anomaly model 442 produces inference results indicating whether an anomaly is detected (e.g., a binary answer of normal or anomaly). At step 450, the application 100 compares the inference results of the classification model 440 and the anomaly model 442 for consistency. The inference results from the models 440, 442 may be considered consistent by respectively detecting a feature (e.g., one of n classes) and an anomaly, or respectively detecting no feature and no anomaly. Consistency of the inference results from the models 440, 442 typically provides improved confidence in the inference results.

If there is consistency, execution proceeds to step 460, where a determination is made whether there is a consistent positive result (i.e., detecting a feature and an anomaly) or a consistent negative result (i.e., detecting no feature and no anomaly). If there is a consistent positive result, execution may proceed to step 470 where at least the detected feature is reported (e.g., in the user interface of the application 100). If there is a consistent negative result, nothing may occur, or in some implementations the input data may be retained and added the feature dataset 410 (as illustrated by line 480) and/or the anomaly dataset 412 (as illustrated by line 482), for use in retraining the models 440, 442 (e.g., when a retraining trigger is met). Such feedback may be less likely to increase model drift than would be the case with a classification model or anomaly model alone, due to the increased confidence provided by the agreement between two models.

Figure 5:
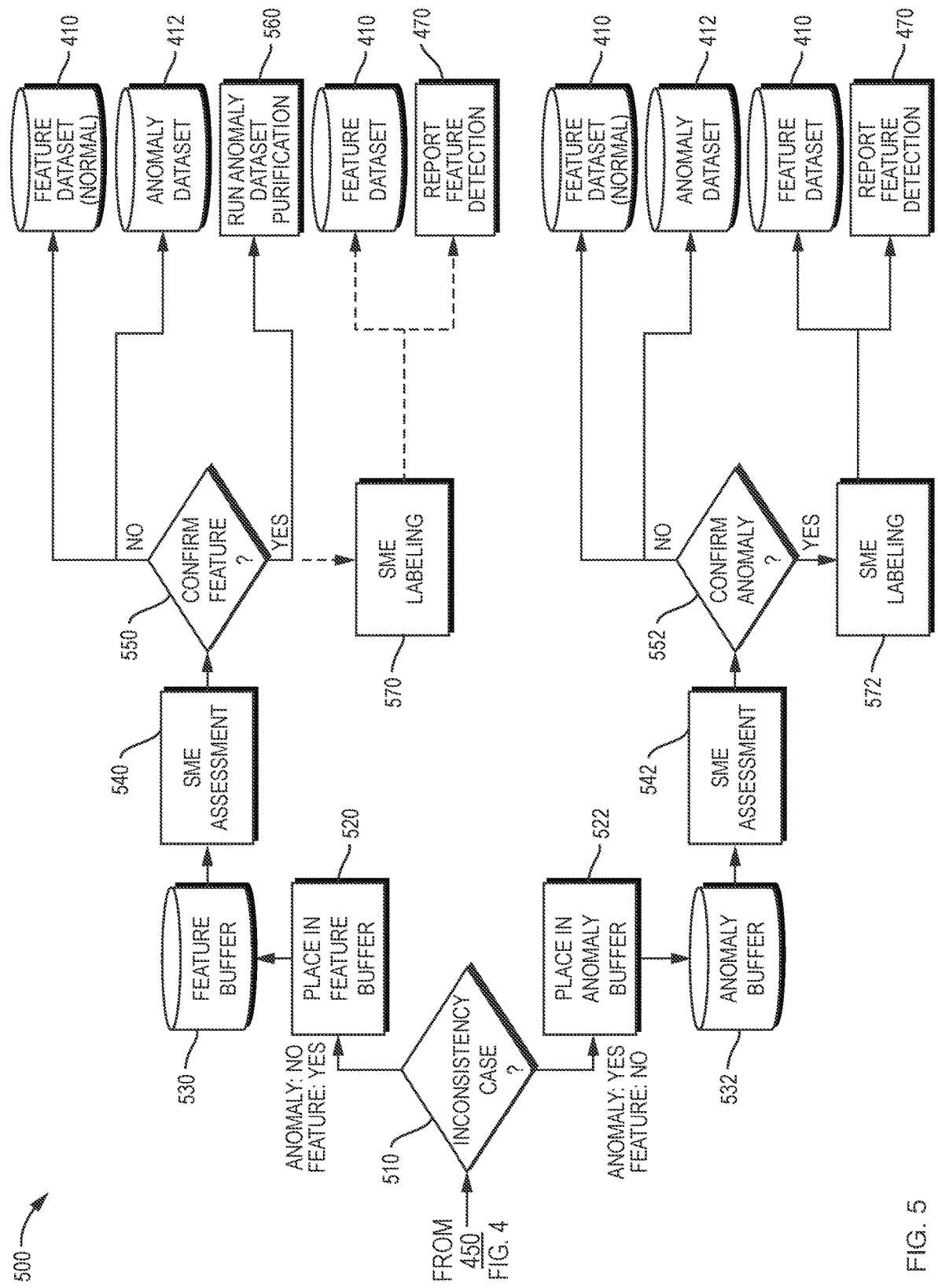
FIG. 5 is a diagram of a second example workflow to train and perform inference with the hybrid classification/anomaly machine learning architecture, which extends the workflow of FIG. 4 to cover cases where there is inconsistency.

FIG. 5 is a diagram of a second example workflow 500 to train and perform inference with the hybrid classification/anomaly machine learning architecture, which extends the workflow 400 of FIG. 4 to cover cases where there is inconsistency. The inference results from the models 440, 442 that are compared in step 450 of FIG. 4 may be inconsistent by the classification model 440 finding a feature but the anomaly model 442 finding no anomaly (referred to herein as the "upper branch case"), or the classification model 340 finding no feature but the anomaly model 342 finding an anomaly (referred to herein as the "lower branch case"). The detection of either case of inconsistency may indicate when additional training or other improvement to the models is required and be used to select data useful in the additional training/improvement.

At step 510, the application 100 determines a case for the inconsistency (i.e., whether it is an upper branch case with a feature but no anomaly, or a lower branch case with no feature but an anomaly). If it is an upper branch case, execution proceeds to step 520 where the input data used to produce the inconsistent results is placed in a feature buffer 530. The feature buffer 530 may be used to accumulate relevant input data to produce a batch, and SME review may occur when a sufficient batch size is reached. At step 540, a SME is prompted to assesses the input data for the inconsistency from the feature buffer 530 and confirm or deny presence of a feature in the input data, thereby injecting ground truth. At step 550, the determination by the SME is examined. If the SME denies presence of the feature (i.e., the feature detection was a false positive) the input data is used to improve the classification model. The application 100 may add the input data to the feature dataset 410 as normal (i.e., featureless) data. When retraining occurs, such addition may assist in training the classification model 440 to not detect similar false positives. The application 100 may also use the input data to improve the anomaly model 442. The input data may also be added to the anomaly dataset 412 as additional normal (i.e., featureless) data. Even though the anomaly model 442 produced the correct result, when retraining occurs, such addition may assist in preventing model drift.

It should be understood that addition of a single sample to either dataset 410, 412 may be insufficient to warrant retraining, and that retraining may be performed periodically, for example, in response to a retraining trigger. The retraining trigger may be accumulating a threshold number of new samples. Alternatively, the retraining trigger may be rate of occurrence of inconsistency, another measure of model performance, or some other event.

Returning to step 550, if the SME confirms presence of a feature (i.e., the feature detection by the classification model was of an actual feature but the anomaly model was in error), it is indicative that the anomaly model 442 requires improvement. There are two ways for improving the anomaly model: the anomaly model 442 may require more normal (i.e., featureless data) or there is some contamination (e.g., some samples with features were mislabeled as normal) in the current anomaly dataset 412 that should be purged. The first case may be covered as more data enters the anomaly dataset 412 through other paths in FIG. 5, and retraining is thereafter performed. The second case may be addressed by, at step 560, executing an anomaly dataset purification process. Details of an example anomaly dataset purification process that may be executed are discussed further below in reference to FIG. 6.

Returning back to step 550, if the SME confirms presence of the feature (i.e., the feature detection by the classification model was of an actual feature but the anomaly model was in error), further labeling by the SME may optionally also be performed to improve the feature model. At step 570, the SME is prompted to inspect the input data used to produce the inconsistent result and confirm the class label. In the rare case where the input data used to produce the inconsistent results is mislabeled, the SME may correct the label. Thereafter the confirmed/corrected input data is added to the feature dataset 410. In either case, the conformed/corrected feature is reported (e.g., in the user interface of the application 100) at step 470.

Returning to step 510, if the determination is of a lower branch case, execution proceeds to step 522, where the input data used to produce the inconsistent results is placed in an anomaly buffer 532. The anomaly buffer 532 may be used to accumulate relevant input data to produce a batch, and SME review may occur when a sufficient batch size is reached. At step 542, a SME is prompted to assesses the input data for the inconsistency from the anomaly buffer 532 and confirm or deny presence of an anomaly in the input data, thereby injecting ground truth. At step 552, the determination by the SME is examined. If the SME denies presence of an anomaly (i.e., the anomaly detection was a false positive), the application 100 uses the input data to improve the anomaly model 442. The application 100 may add the input data to the anomaly dataset 412 as normal (i.e., featureless) data, to reinforce that similar input data should be considered normal when retraining occurs. When enough new samples are added, occurrences of anomaly detection false positives may decrease. The input data may also be used to improve the classification model 440. The application 100 may add the input data to the feature dataset 410 as additional normal (i.e., featureless) data. Even though the feature model 440 produced the correct result, when retraining occurs, such addition may assist in preventing model drift.

Returning to step 552, if the SME confirms presence of an anomaly (i.e., the anomaly detection by the anomaly model 442 was correct, but the feature model 440 was in error), the finding may be used to improve the classification model 440. At step 572, the SME inspects the input data used to produce the inconsistent results and provides a class label. The labeled input data is added to the feature dataset 410, and the detected feature is reported (e.g., in the user interface of the application 100) at step 470. This mechanism may provide a capability for training the feature model 440 to detect new features. As mentioned above, it should be remembered that adding a single sample to either dataset 410, 412 may be insufficient to warrant retraining, and that retraining may be performed periodically, in response to a retraining trigger.

Figure 6:
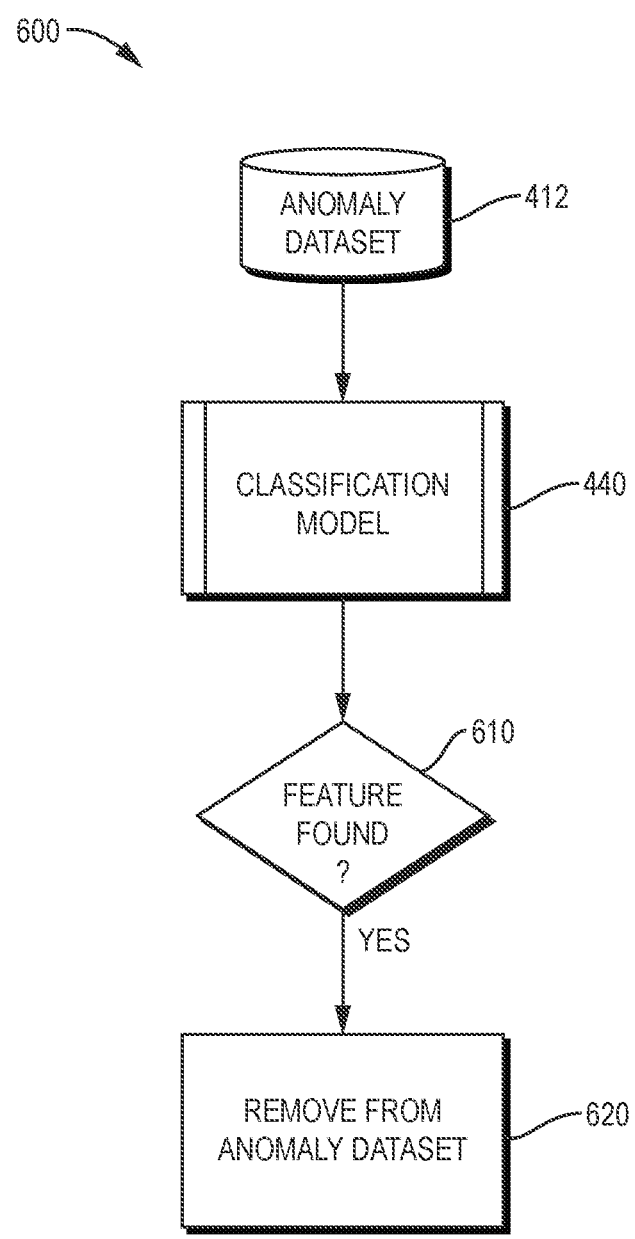
FIG. 6 is a workflow diagram for an example anomaly dataset purification process.

FIG. 6 is a workflow diagram for an example anomaly dataset purification process 600. The anomaly dataset purification process 600 may be performed as part of the flow of FIG. 5, or alternatively, as a separately triggered event (e.g., each time retraining is performed, in response to a measure of model performance, or some other event). In the anomaly dataset purification process 600 the classification model 440 is trusted and used to improve the anomaly dataset 412 (e.g., without an injection of new ground truth). The anomaly dataset 412 (e.g., in its entirety) is submitted to the classification model 440 and inference is performed to detect any class of feature in each sample. For each sample, at step 610, a determination is made whether any class of feature was found. If so, execution proceeds to step 620, where the application 100 removes the sample from the anomaly dataset 412, to improve the anomaly model 442 when retraining occurs. Otherwise, the application 100 retains the sample in the anomaly dataset 412 (not shown). Thresholds of the classification model 440 may be varied to tune the intensity of sample removal.

Figure 7:
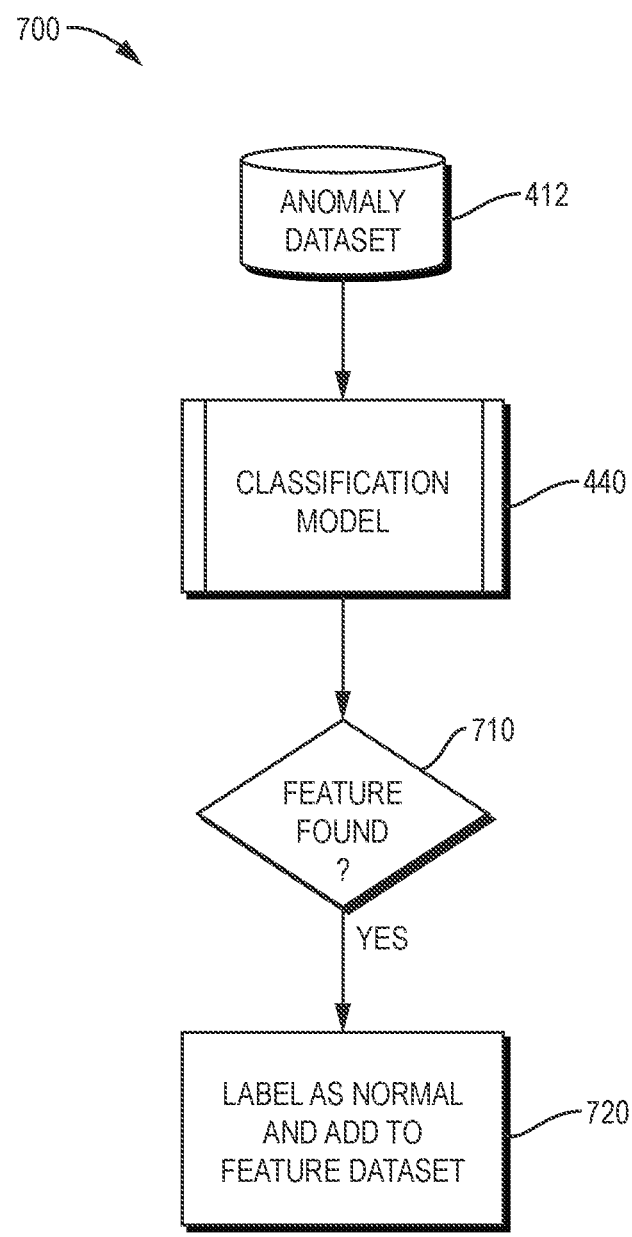
FIG. 7 is a workflow diagram for an example classification model improvement process.

Just as the classification model 440 can be trusted, and used to improve the anomaly dataset 412, the anomaly dataset 412 can instead be trusted and used to improve the classification model 440 (e.g., without an injection of new ground truth). FIG. 7 is a workflow diagram for an example classification model improvement process 700. The classification model improvement process 700 may be performed as a triggered event, in response to one or more criteria (e.g., each time retraining is performed, in response to a measure of model performance, or some other event). The anomaly dataset 412 (e.g., in its entirety) is submitted to the classification model 440 and inference is performed to detect any feature in each sample. For each sample, at step 710, a determination is made whether a feature was found. Since the anomaly dataset 412 should not include feature data, finding features may indicate a problem with the classification model 440. If a feature is found, execution proceeds to step 720, where the application 100 labels the sample from the anomaly dataset 412 as normal (i.e., featureless) and adds it to the feature dataset 410, to improve the classification model 440 when retraining occurs. Otherwise, the application 100 does not add the sample (not shown). Thresholds of the anomaly model 442 may be varied to tune the intensity of samples added.

Figure 8:
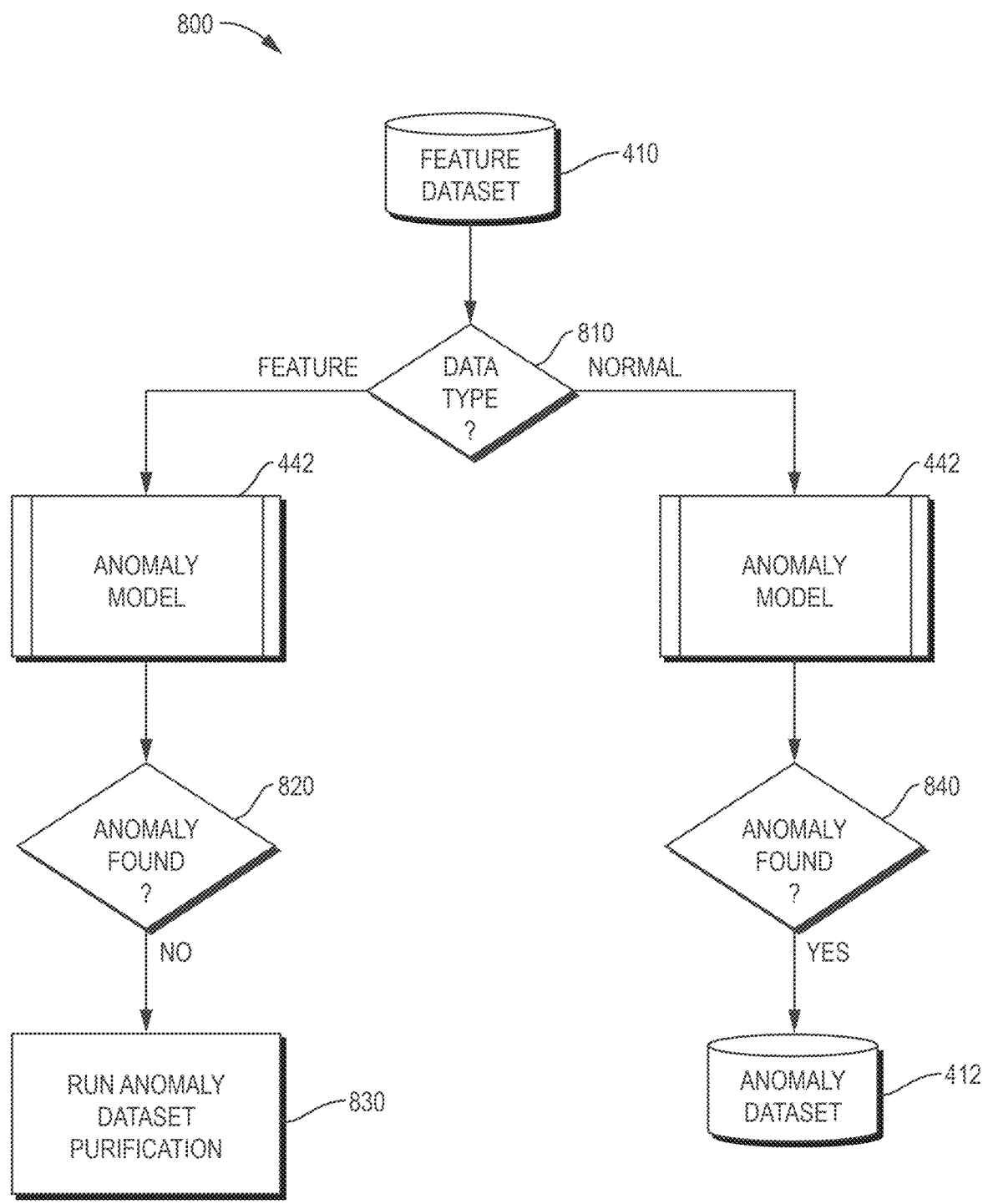
FIG. 8 is a workflow diagram for an example anomaly model improvement process.

In the anomaly dataset purification process 600 of FIG. 6 and the classification model improvement process 700 of FIG. 7, the anomaly dataset 412 is processed through the classification model 440. Similarly, the feature dataset 410 may be processed through the anomaly model 442. FIG. 8 is a workflow diagram for an example anomaly model improvement process 800. In the anomaly model improvement process 800 the feature dataset 410 is trusted and used to improve the anomaly model 442 (e.g., without an injection of new ground truth). The anomaly model improvement process 800 may be performed as a triggered event, in response to one or more criteria (e.g., each time retraining is performed, in response to a measure of model performance, or some other event). At step 810, the application 100 divides the classification dataset 410 (e.g., in its entirety) into feature (i.e., class) samples and normal (i.e., featureless) samples. The feature samples are submitted to the anomaly model 442 and inference is performed to detect any anomaly in each sample. For each feature samples, at step 820, a determination is made whether an anomaly was found. Since the feature samples include features identified by the classification model 440, finding no anomaly indicates a problem with the anomaly model 442. In response to finding no anomaly for a number of samples where they should have been found, at step 830, the application 100 triggers the anomaly dataset purification process to improve the anomaly model 442. Otherwise, the application 100 may do nothing further (not shown). Likewise, the normal samples are submitted to the anomaly model 442 and inference is performed to detect any anomaly in each sample. For each normal sample, at step 840, a determination is made whether an anomaly was found. Since the normal samples were identified to not include any feature, finding an anomaly indicates a problem with the anomaly model 442. In response to finding an anomaly, the application 100 adds the sample to the anomaly dataset 412, to improve the anomaly model 442 when retraining occurs. Otherwise, the application 100 does not add the sample (not shown). Thresholds of the classification model 440 may be varied to tune the intensity of samples added.

Figure 9:
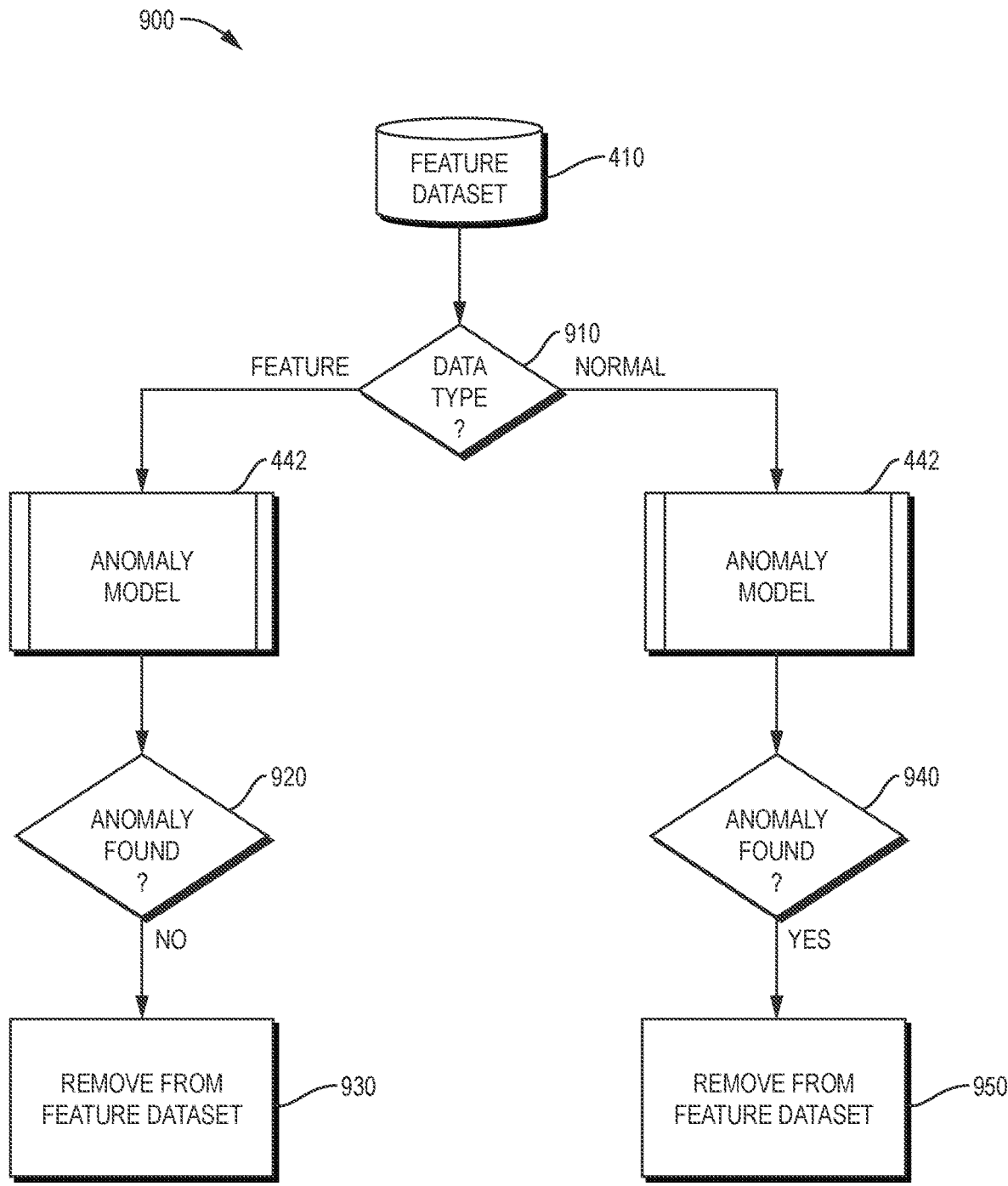
FIG. 9 is a workflow diagram for an example feature dataset purification process.

Just as the classification dataset 410 can be trusted, and used to improve the anomaly model 442, the anomaly model 442 can instead be trusted and used to improve the feature dataset 410 (e.g., without an injection of new ground truth). FIG. 9 is a workflow diagram for an example feature dataset purification process 900. The feature dataset purification process 900 may be performed as a triggered event, in response to one or more criteria (e.g., each time retraining is performed, in response to a measure of model performance, or some other event). At step 910, the application 100 divides the classification dataset 410 (e.g., in its entirety) into feature (i.e., class) samples and normal (i.e., featureless) samples. The feature samples are submitted to the anomaly model 442 and inference is performed to detect any anomaly in each sample. For each feature sample, at step 920, a determination is made whether an anomaly was found. Since the feature samples include features identified by the classification model 440, finding no anomaly indicates a problem with the feature dataset 410. In response to finding no anomaly, at step 940, the application 100 removes the sample from the feature dataset 410, to improve the feature model 440 when retraining occurs. Otherwise, the application 100 may do nothing further (not shown). Likewise, the normal samples are submitted to the anomaly model 442 and inference is performed to detect any anomaly in each sample. For each normal sample, at step 940, a determination is made whether an anomaly was found. Since the normal samples were identified to not include any feature, finding an anomaly indicates a problem with the feature dataset 410. In response to finding an anomaly, the application 100 removes the sample from the feature dataset 410, to improve the feature model 440 when retraining occurs. Otherwise, the application 100 retains the sample in the anomaly dataset 412 (not shown). Thresholds of the classification model 440 may be varied to tune the intensity of sample removal.

It may be noted that while processes 600-900 may require additional processing, the processing burden may be considered minimal. For example, each process involves processing the entirety of the dataset, but only once. Processing the entirety of a training dataset once is referred to as an epoch. Retraining of a model usually involves hundreds or thousands of epochs and therefore may be hundreds or thousands of times more costly than processes 600-900 if they are triggered in this manner.

Figure 10:
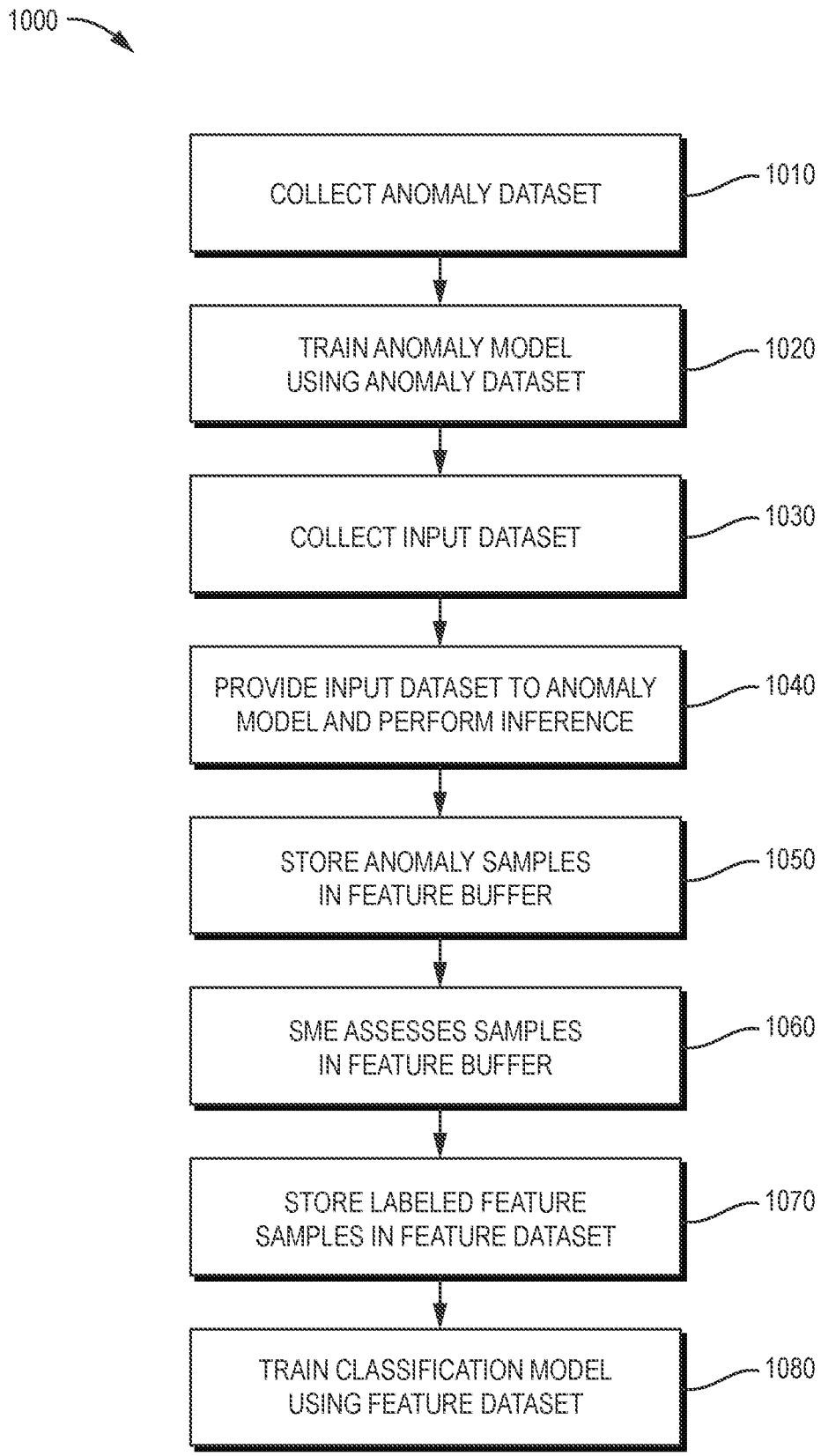
FIG. 10 is a flow diagram of a hybrid startup procedure that may be used with the classification/anomaly machine learning architecture.
Figure 11A:
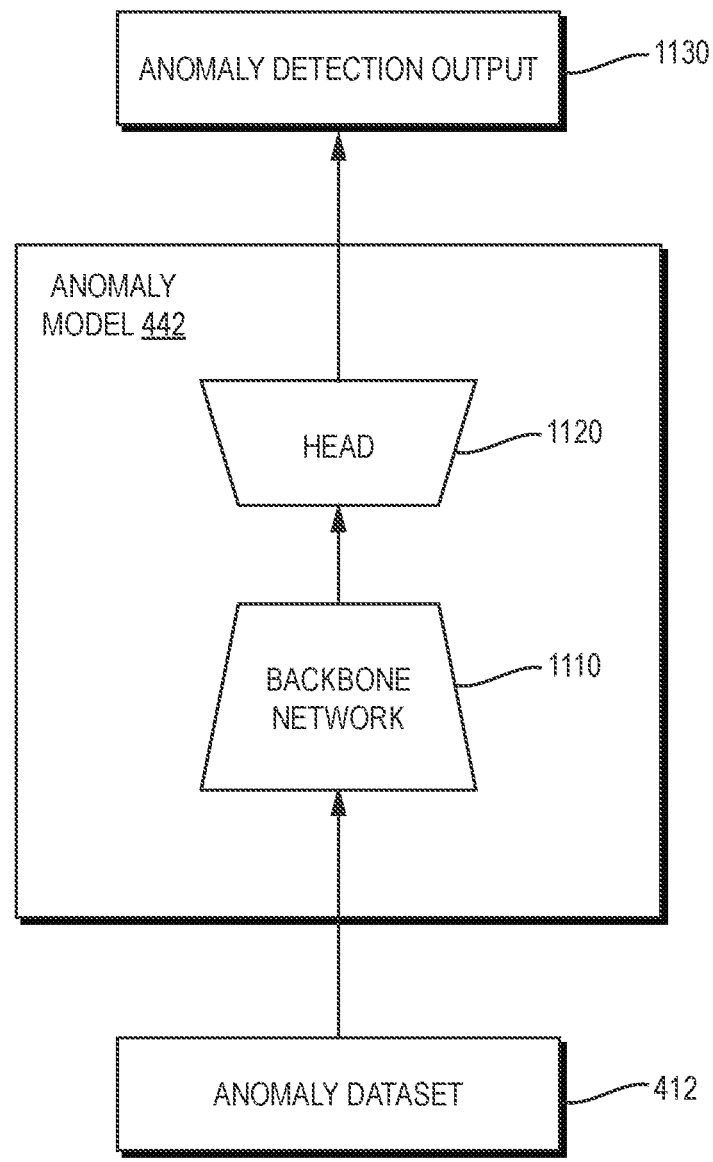
FIGS. 11A-11D are a series of workflow diagrams that provide more detail for certain of the steps of FIG. 10.

The above-described hybrid classification/anomaly machine learning architecture may enable improved startup training techniques that reduce the labeling burden on a SME and produce at least a minimally functional classification model to enable early exploitation. FIG. 10 is a flow diagram of a hybrid startup procedure 1000 that may be used with the classification/anomaly machine learning architecture. FIGS. 11A-11D are a series of workflow diagrams that provide more detail for certain of the steps of FIG. 10. At step 1010, and as shown in FIG. 11A, an anomaly dataset 412 is collected that includes only normal data. The anomaly dataset 412 may be relatively small. For instance, returning to the example of inspection of representations of a bridge for damage, the anomaly dataset 412 may be samples taken from a relatively small number representations (e.g., hundreds of images, 3D point clouds, etc.) of bridges in which there are no cracks or other damage. At step 1020, and as shown in FIG. 11A, the application 100 trains the anomaly model 442 to produce an anomaly detection output 1130 using the anomaly dataset 412, for example, using semi-supervised training. The training may involve training both a backbone network 1110 and a head (e.g., a reconstruction head) 1120 of a neural network which makes up the anomaly model 442. For instance, returning to the example of inspection of representations of a bridge for damage, the anomaly model 442 learns to reconstruct representations with no cracks or other damage (i.e., to reconstruct the normal representations it receives without error).

Figure 11B:
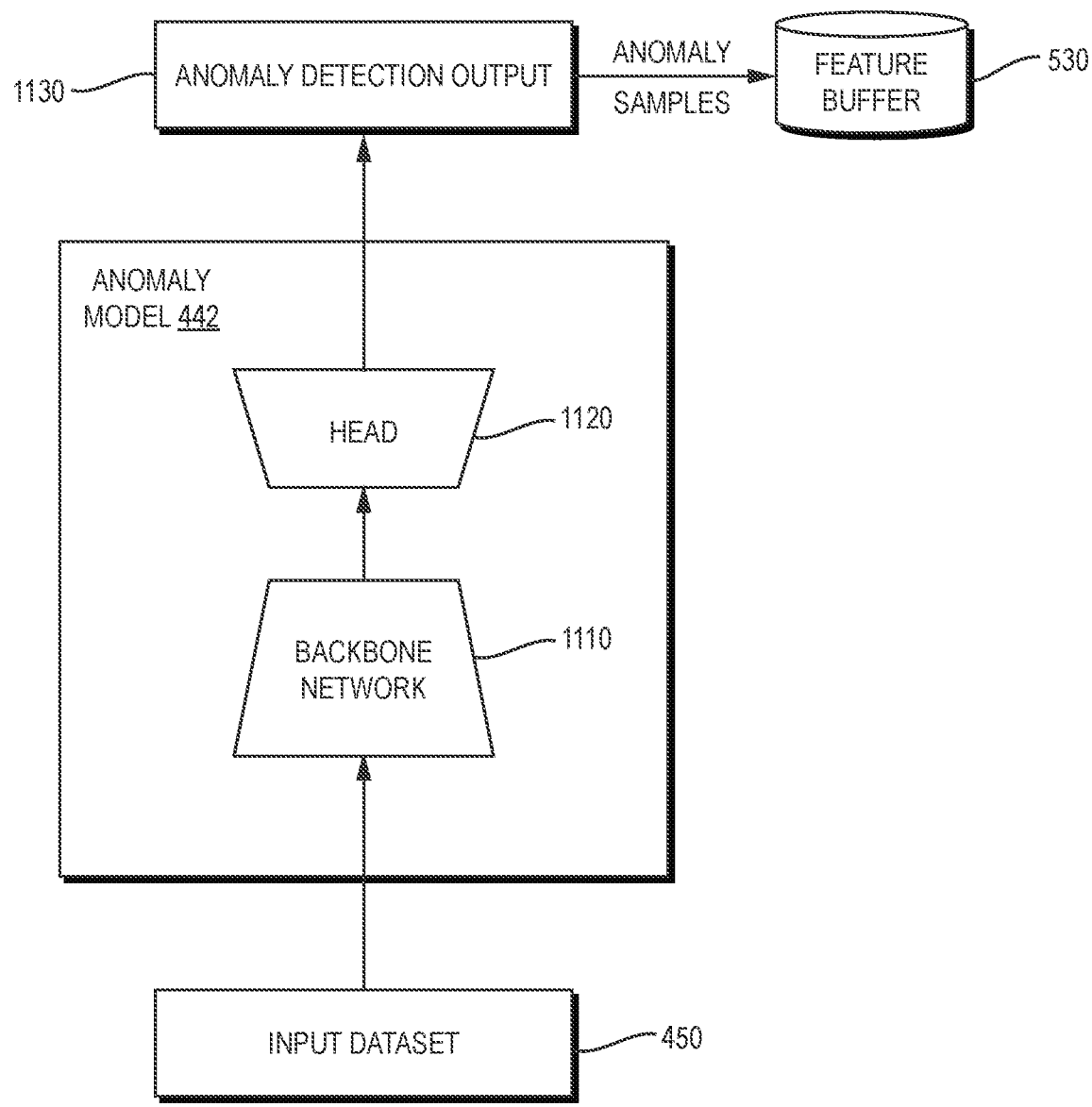

At step 1030, and as shown in FIG. 11B, an input dataset 455 is collected that includes unknown data (i.e., whether a sample is normal or includes an anomaly is not known). The input dataset 455 may be larger than the anomaly dataset 412. For instance, returning to the example of inspection of representations of a bridge for damage, the input dataset 455 may be samples taken from a relatively large number representations (e.g., thousands of images, 3D point clouds, etc.) of bridges in which there may or may not be cracks or other damage. At step 1040, and as shown in FIG. 11B, the application 100 provides the input dataset 455 to the anomaly model 442, which in inference produces an anomaly detection output 1130. The anomaly detection output 1130 includes samples predicted to include an anomaly (anomaly samples) and those predicted to be normal (normal samples). For instance, returning to the example of inspection of representations of a bridge for damage, the anomaly model 442 reconstructs representations from the input dataset 455. The assumption is that the representations with no cracks or other damage will be correctly reconstructed (i.e., because the anomaly model 442 has learned to do this) and the representations with cracks or other damage will be incorrectly reconstructed (i.e., because the anomaly model 442 has not learned to do this). By measuring reconstruction error and other indicia, the anomaly model 442 may identify anomalous representations without having ever seen one. At step 1050 and as shown in FIG. 5B, the application 100 stores at least the anomaly samples in a feature buffer 530.

Figure 11C:
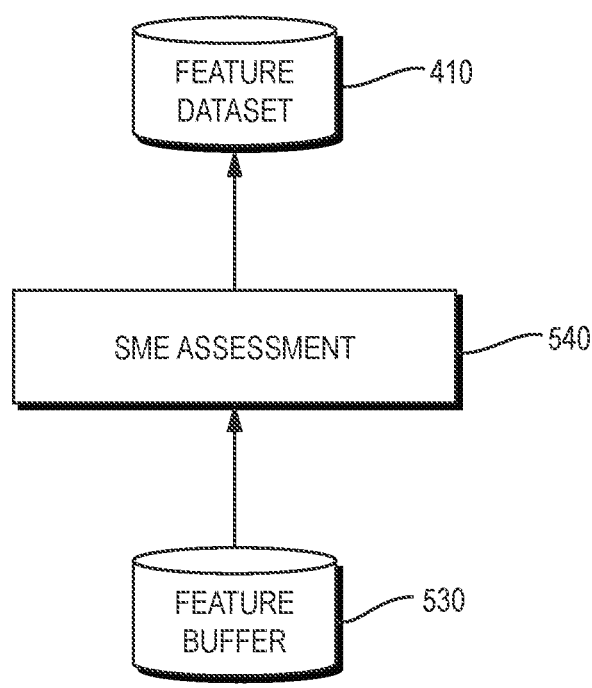

At step 1060, and as shown in FIG. 11C, a SME is prompted to assesses the samples in the feature buffer 530 and create class labels. The collected samples in the feature buffer will likely contain mostly pertinent samples (i.e., samples that include a feature), in contrast to random samples from the input dataset 455. For instance, returning to the example of inspection of representations of a bridge for damage, the SME may draw a polygon around each crack in the samples in the feature buffer and label it as such. At step 1070, and as shown in FIG. 11C, the labeled feature samples are stored in the feature dataset 410. Additional normal samples (which may also be sourced from the anomaly dataset 412, or elsewhere) may also be stored in the feature dataset 410.

Figure 11D:
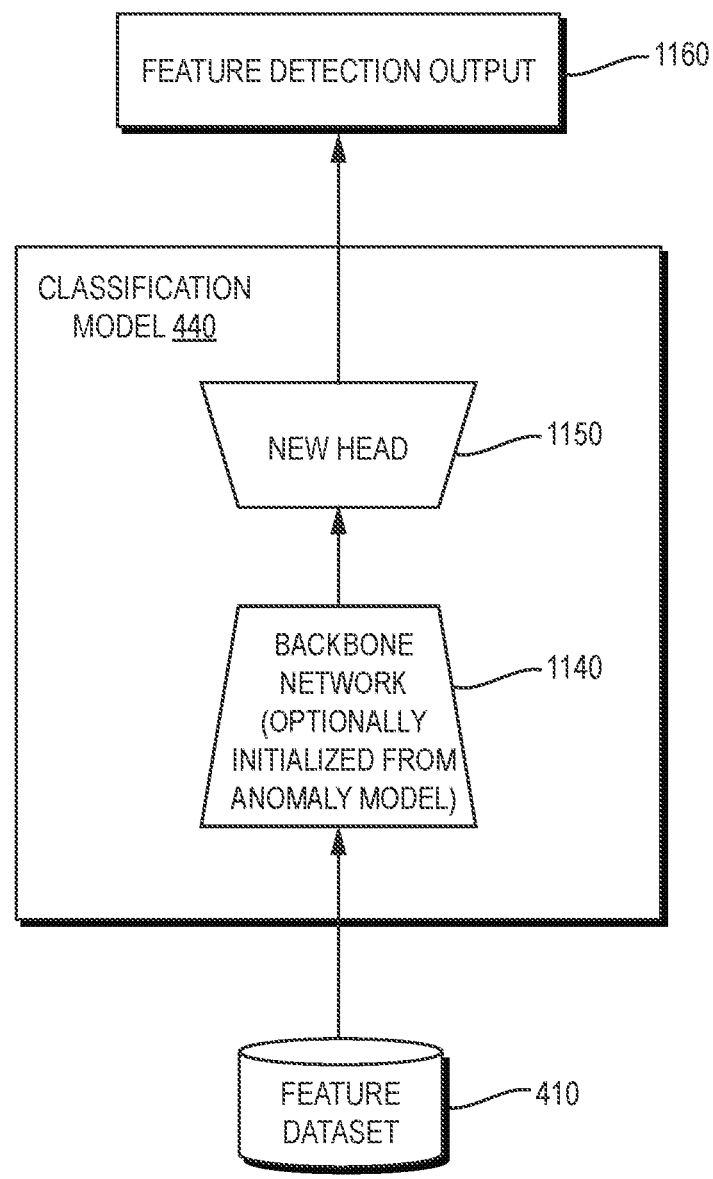

At step 1080, and as shown in FIG. 11D, the application 100 trains the classification model 442 to produce a feature detection output 1160 using the feature dataset 410, for example, using supervised training with transfer learning. Labeled feature samples and normal samples are provided to the classification model 440. Via transfer learning, the backbone network 1140 of the classification model 440 may optionally be initialized to the trained weights to the backbone network 1110 of the anomaly model 442. In this sort of implementation, only a new head 1150 (e.g., a new reconstruction head) of the classification model 440 may be trained with new weights. Because the number of new weights is small, a minimal classification model may be achieved with only a handful of labeled samples. For instance, returning to the example of inspection of representations of a bridge for damage, the classification model 440 may learn to recognize representations with some types of cracks with only a handful of labeled samples, allowing the classification model to begin to provide useful insights early.

In summary, a hybrid classification/anomaly machine learning architecture is provided that combines a classification model and an anomaly model. It should be understood that a wide variety of adaptations and modifications may be made to the architecture and techniques used therewith. It should be remembered that functionality may be implemented using different software, hardware, and various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for using a hybrid classification/anomaly machine learning architecture to inspect infrastructure for damage, comprising:

accessing input data that includes representations of infrastructure, wherein the infrastructure includes at least one of bridges, buildings, roads, railways, electrical and communications networks, or equipment;

submitting the input data in parallel to a classification model and an anomaly model of a classification/anomaly machine learning architecture executing on one or more computing devices;

producing, by the classification model, a first inference result that indicates whether a class of damage is detected in the representations of infrastructure;

producing, by the anomaly model, a second inference result that indicates whether something other than undamaged condition is detected in the representations of infrastructure;

comparing, by an application executing on the one or more computing devices, the first inference result and the second inference result for consistency, wherein the first inference result and the second inference result are considered to have consistency when the first inference result indicates a class of damage is detected and the second inference result indicates something other than undamaged condition is detected or when the first inference result indicates no class of damage is detected and the second inference result indicates undamaged condition is detected; and in response to consistency between the first inference result and the second inference result and the first and second inference results being consistent positive results, reporting the class of damage to the infrastructure in a user interface of the application.

2. The method of claim 1, further comprising:

in response to consistency between the first inference result and the second inference result, adding the input data to a feature dataset used to train the classification model and/or adding the input data to an anomaly dataset used to train the anomaly model.

3. The method of claim 1, further comprising:
in response to inconsistency between the first inference result and the second inference result and the first inference result indicating a class of damage is detected and the second inference result indicating undamaged condition is detected is detected,
adding the input data to a feature buffer, and obtaining a subject matter expert (SME) assessment of the input data that indicates whether there is a class of damage to inject ground truth.

4. The method of claim 3, further comprising:
in response to the SME assessment indicating no class of damage,
adding the input data to a feature dataset used to train the classification model and/or adding the input data to an anomaly dataset used to train the anomaly model.

5. The method of claim 3, further comprising:
in response to if the SME assessment indicating a class of damage,
activating an anomaly dataset purification process that is configured to remove contaminated samples from the anomaly dataset used to train the anomaly model.

6. The method of claim 1, further comprising:
in response to inconsistency between the first inference result and the second inference result and if the first inference result indicating no class of damage is detected and the second inference result indicating something other than undamaged condition is detected,
adding the input data to an anomaly buffer, and obtaining a subject matter expert (SME) assessment of the input data that indicates whether there is something other than undamaged condition to inject ground truth.

7. The method of claim 6, further comprising:
in response to the SME assessment indicating undamaged condition,
adding the input data to a feature dataset used to train the classification model and/or adding the input data to an anomaly dataset used to train the anomaly model.

8. The method of claim 6, further comprising:
in response to the SME assessment indicating something other than undamaged condition,
obtaining a label for the input data from the SME, and adding the input data to a feature dataset used to train the classification model.

9. The method of claim 1, further comprising
executing a classification model improvement process that is configured to add normal samples from the anomaly dataset used to train the anomaly model to the feature dataset used to train the classification model.

10. The method of claim 1, further comprising
executing an anomaly model improvement process that is configured to add normal samples from the feature dataset used to train the classification model to the anomaly dataset used to train the anomaly model.

11. The method of claim 1, further comprising:
activating a feature dataset purification process that is configured to remove contaminated samples from the feature dataset used to train the classification model.

12. A system that uses a hybrid classification/anomaly machine learning architecture to inspect infrastructure for damage, comprising:
one or more computing devices including one or more processors;
an input dataset;
a classification model;
an anomaly model; and
an application that when executed on the one or more processors of the one or more computing devices is operable to:
access input data that includes representations of infrastructure, wherein the infrastructure includes at least one of bridges, buildings, roads, railways, electrical and communications networks, or equipment;
submit the input data from the input dataset in parallel to the classification model and the anomaly model,
compare a first inference result from the classification model that indicates whether a class of damage is detected in the input data and a second inference result from the anomaly model that indicates whether something other than undamaged condition is detected in the input data for consistency, wherein the first inference result and the second inference result are considered to have consistency when the first inference result indicates a class of damage is detected and the second inference result indicates something other than undamaged condition is detected or when the first inference result indicates no class of damage is detected and the second inference result indicates undamaged condition is detected, and
in response to consistency between the first inference result and the second inference result, at least one of a) report a detected feature or b) add the input data to a feature dataset used to train the classification model and/or add the input data to an anomaly dataset used to train the anomaly model.

13. The system of claim 12, wherein the application when executed on one or more processors of one or more computing devices is further operable to:
in response to inconsistency between the first inference result and the second inference result, add the input data to a buffer, obtain a subject matter expert (SME) assessment of the input data that indicates whether there is a feature or an anomaly to inject ground truth, and use the input data to train the classification model and/or to train the anomaly model.

* * * * *